US012263725B2

(12) United States Patent
Nakayama et al.

(10) Patent No.: US 12,263,725 B2
(45) Date of Patent: Apr. 1, 2025

(54) VEHICLE DOOR

(71) Applicant: MAZDA MOTOR CORPORATION, Hiroshima (JP)

(72) Inventors: Daisuke Nakayama, Aki-gun (JP); Tomohiro Komaji, Aki-gun (JP); Hidemitsu Shinhara, Aki-gun (JP); Masaki Mouri, Aki-gun (JP); Eiji Oro, Aki-gun (JP); Masayoshi Sannabe, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 263 days.

(21) Appl. No.: 18/058,136

(22) Filed: Nov. 22, 2022

(65) Prior Publication Data

US 2023/0182547 A1 Jun. 15, 2023

(30) Foreign Application Priority Data

Dec. 14, 2021 (JP) ................................ 2021-202629

(51) Int. Cl.
*B60J 5/04* (2006.01)

(52) U.S. Cl.
CPC .......... *B60J 5/0423* (2013.01); *B60J 5/0415* (2013.01)

(58) Field of Classification Search
CPC ...... B60J 5/0415; B60J 5/0422; B60J 5/0423; B60J 5/0429; B60J 5/0437; B60J 5/0447; B60J 5/0433

(Continued)

(56) References Cited

U.S. PATENT DOCUMENTS 9,016,747 B2 * 4/2015 Kuroki ...................... B60R 1/06 296/1.11
11,691,489 B2 * 7/2023 Kumamoto .............. B60J 10/50 296/146.6
2009/0026795 A1 * 1/2009 Tate ...................... B60J 5/0437 296/146.6

FOREIGN PATENT DOCUMENTS

DE 102007026523 A1 * 12/2007 ................ B60J 5/00
EP 3892481 A1 10/2021

(Continued)

OTHER PUBLICATIONS

The extended European search report issued by the European Patent Office on May 12, 2023, which corresponds to European Patent Application No. 22208727.2-1009 and is related to U.S. Appl. No. 18/058,136.

*Primary Examiner* — Amy R Weisberg
*Assistant Examiner* — Denise L. Esquivel
(74) *Attorney, Agent, or Firm* — Studebaker Brackett PLLC

(57) ABSTRACT

A vehicle door is provided having an outer panel reinforced by a panel reinforcement and which is configured to generate low-frequency sound dominantly at the time of closing the door. The door has an outer panel openably/closably attached to a vehicle body by a front hinge; and a panel reinforcement extending in a vehicle front-rear direction on an inner side of the outer panel. The outer panel and the panel reinforcement are fixed by plural adhesion sections. The number of the adhesion sections in an upper area of the outer panel is larger than the number of the adhesion sections in a lower area of the outer panel. The number of the adhesion sections provided in a front lower area near the front hinge in the lower area is larger than the number of adhesion sections in a rear lower area away from the front hinge in the lower area.

14 Claims, 6 Drawing Sheets

(58) Field of Classification Search
USPC ............................................ 296/146.6, 146.5
See application file for complete search history.

(56) References Cited

FOREIGN PATENT DOCUMENTS

| | | |
|---|---|---|
| JP | 2021-003962 A | 1/2021 |
| JP | 2021-045995 A | 3/2021 |

* cited by examiner

VEHICLE DOOR

TECHNICAL FIELD

The present disclosure relates to a vehicle door.

BACKGROUND

A vehicle door includes an outer panel on a vehicle outer side and an inner panel on a cabin side. Of these panels, particularly, the outer panel is frequently touched by persons and objects. For this reason, a panel reinforcement as a reinforcing member is attached to an inner side of the outer panel, so as to prevent easy deformation of the outer panel, as seen in Japanese Patent Document JP-A-2021-45995.

Upon designing a vehicle, it is also important to lower a frequency of sound, which is generated at the time of closing the door, so as to produce bass sound and, consequently, to give the vehicle a sense of luxury. However, in the case where the panel reinforcement, which is arranged on the inner side of the outer panel, is fixed by an adhesive with a clearance being provided therebetween, a natural vibration frequency of the outer panel is increased while rigidity thereof is increased. As a result, the sound that is generated at the time of closing the door is shifted to the high-frequency side, and the sense of luxury is lost.

SUMMARY

In view of the above, the present disclosure has a purpose of providing a vehicle door in which an outer panel is reinforced by a panel reinforcement and which is configured to generate low-frequency sound dominantly at the time of closing the door.

In order to achieve the above purpose, the present disclosure relates to the following.

First, the present disclosure relates to a vehicle door having an outer panel that is attached in an openable and closable manner to a vehicle body by a front hinge; and a panel reinforcement that extends in a vehicle front-rear direction on an inner side of the outer panel, and in which the outer panel and the panel reinforcement are fixed by plural adhesion sections, in which the outer panel includes:

a first belt-like convex section that is projected to a vehicle outer side and extends in the vehicle front-rear direction;

a belt-like concave section that is provided under the first belt-like convex section, is projected to a cabin side, and extends in the vehicle front-rear direction; and a second belt-like convex section that is provided under the belt-like concave section, is projected to the vehicle outer side, and extends in the vehicle front-rear direction, the belt-like concave section includes:

a concave bottom line that is located between an upper end and a lower end of the belt-like concave section, is most projected to the cabin side, and extends in a front-rear direction, the outer panel includes:

an upper area that is located above the concave bottom line; and a lower area that is located under the concave bottom line, the number of the adhesion sections in the upper area is larger than the number of the adhesion sections in the lower area, and the number of the adhesion sections that are provided in the lower area and in a front lower area near the front hinge is larger than the number of the adhesion sections that are provided in the lower area and in a rear lower area away from the front hinge.

According to the present disclosure, the number of the adhesion sections in the upper area, which is located above the concave bottom line of the belt-like concave section of the outer panel, is larger than the number of the adhesion sections in the lower area, which is located under the concave bottom line of the belt-like concave section of the outer panel. In addition, the number of the adhesion sections in a front lower area near the front hinge in the lower area is larger than the number of the adhesion sections in a rear lower area away from the front hinge in the lower area. Since the number of the adhesion sections in the upper area is larger than the number of the adhesion sections in the lower area, rigidity of the upper area is higher than rigidity of the lower area. Accordingly, when an occupant touches the upper area of the outer panel to open/close the door, the upper area is prevented from being easily deflected by an external force due to the sufficiently high rigidity.

In addition, since the number of the adhesion sections in the front lower area is larger than the number of the adhesion sections in the rear lower area, rigidity of the rear lower area is lower than rigidity of the front lower area. This rear lower area is an area where door closing sound is generated when the occupant closes the door, has the sufficiently low rigidity, and thus has a low natural vibration frequency. Accordingly, when the occupant closes the door, low-frequency sound, that is, the heavy door closing sound can be generated.

The plural adhesion sections may exist on the concave bottom line.

According to this configuration, since the plural adhesion sections exist on the concave bottom line, the rigidity of the belt-like concave section is sufficiently maintained.

The first belt-like convex section may have a convex ridge line that is located between an upper end and a lower end of the first belt-like convex section, is most projected to the vehicle outer side, and extends in the front-rear direction. The number of the adhesion sections provided between the concave bottom line and the convex ridge line may fall within a range of 70% to 90% of the number of the adhesion sections, at each of which the outer panel and the panel reinforcement adhere to each other.

According to this configuration, the number of the adhesion sections that are provided between the concave bottom line and the convex ridge line falls within the range of 70% to 90% of the number of the adhesion sections, at each of which the outer panel and the panel reinforcement adhere to each other. Therefore, the area, rigidity of which tends to be low, and which is located between the first belt-like convex section and the belt-like concave section, is sufficiently stiffened.

The panel reinforcement may exist in a manner to expand from a front end of the outer panel toward a rear end thereof.

According to this configuration, the panel reinforcement exists in the manner to expand from the front end of the outer panel toward the rear end thereof. Therefore, the rigidity of the outer panel is sufficiently maintained to prevent the outer panel from being easily deflected by the external force.

The panel reinforcement may have a first panel reinforcement section that extends from the front end of the outer panel toward the rear end thereof; and a second panel reinforcement section that is arranged under the first panel reinforcement section and extends from the front end of the outer panel toward the rear end thereof. The first panel reinforcement section may be fixed to the outer panel only by the adhesion section that is arranged in the upper area, and the second panel reinforcement section may be fixed to the outer panel by the adhesion sections that are arranged in the upper area and the lower area.

According to this configuration, the panel reinforcement has the first panel reinforcement section that extends from the front end of the outer panel toward the rear end thereof; and the second panel reinforcement section that is arranged under the first panel reinforcement section and extends from the front end of the outer panel toward the rear end thereof. Therefore, even when the vehicle is subjected to a lateral collision, the rigidity of the outer panel is sufficiently maintained to prevent the outer panel from being easily deformed by the external force.

The first panel reinforcement section may be arranged to slope downward from the front end of the outer panel toward the rear end thereof, the second panel reinforcement section may be arranged to slope downward from the front end of the outer panel toward the rear end thereof, and the downward slope of the second panel reinforcement section may be steeper than the downward slope of the first panel reinforcement section.

According to this configuration, the downward slope of the second panel reinforcement section is steeper than the downward slope of the first panel reinforcement section. Thus, a sufficiently large area where the first panel reinforcement section and the second panel reinforcement section are not fixed is secured in the rear lower area of the outer panel. For this reason, the rear lower area has the sufficiently low rigidity, thus has the low natural vibration frequency, and easily generates the heavy door closing sound.

A vertical length of the second belt-like convex section may be increased toward a vehicle rear side.

According to this configuration, the vertical length of the second belt-like convex section is increased toward the vehicle rear side. Thus, the area that is located between the belt-like concave section and the second belt-like convex section and has the low rigidity is increased toward the vehicle rear side. Therefore, such an area has the low natural vibration frequency and easily generates the heavy door closing sound.

The adhesion sections may only be disposed in the first belt-like convex section and the belt-like concave section.

According to this configuration, since the adhesion sections are only disposed in the first belt-like convex section and the belt-like concave section, the second belt-like convex section has the sufficiently low rigidity. For this reason, the second belt-like convex section has the low natural vibration frequency and easily generates the heavy door closing sound.

In addition, the present disclosure relates to a vehicle door having an outer panel that is attached in an openable and closable manner to a vehicle body by a front hinge; and a panel reinforcement that extends in a vehicle front-rear direction on an inner side of the outer panel, and in which the outer panel and the panel reinforcement are fixed by plural adhesion sections. The outer panel is divided by a horizontal line and a vertical line, each of which passes through a center of gravity of the outer panel, when the outer panel is seen from a vehicle outer side, and has:

- a first quadrant that is located above the horizontal line and in front of the vertical line;
- a second quadrant that is located above the horizontal line and behind the vertical line;
- a third quadrant that is located under the horizontal line and behind the vertical line; and
- a fourth quadrant that is located under the horizontal line and in front of the vertical line, and
- the number of the adhesion sections in each of the first quadrant and the second quadrant is larger than the number of the adhesion sections in each of the third quadrant and the fourth quadrant.

According to the present disclosure, when the outer panel is seen from the vehicle outer side, the number of the adhesion sections in each of the first quadrant and the second quadrant, which are located above the horizontal line passing the center of gravity of the outer panel, is larger than the number of the adhesion sections in each of the third quadrant and the fourth quadrant, which are located under the horizontal line. Since the number of the adhesion sections in the first quadrant and the second quadrant is larger than the number of the adhesion sections in the third quadrant and the fourth quadrant, rigidity in the first quadrant and the second quadrant is higher than rigidity in the third quadrant and the fourth quadrant. Accordingly, when the occupant touches the first quadrant or the second quadrant of the outer panel to open/close the door, the first quadrant or the second quadrant of the outer panel is prevented from being easily deflected by the external force due to the sufficiently high rigidity. In addition, the third quadrant and the fourth quadrant of the outer panel have the lower rigidity than the first quadrant and the second quadrant thereof, and thus has the low natural vibration frequency. Therefore, when the occupant closes the door, the heavy door closing sound can be generated in the third quadrant and the fourth quadrant.

The number of the adhesion sections in the fourth quadrant may be larger than the number of the adhesion sections in the third quadrant.

According to this configuration, since the number of the adhesion sections in the fourth quadrant is larger than the number of the adhesion sections in the third quadrant, the rigidity in the third quadrant is lower than the rigidity in the fourth quadrant. This third quadrant is the area where the door closing sound is generated when the occupant closes the door, has the sufficiently low rigidity, and thus has the low natural vibration frequency. Therefore, when the occupant closes the door, the heavy door closing sound can be generated in the third quadrant.

The panel reinforcement may have a first panel reinforcement section that extends from the front end of the outer panel toward the rear end thereof; and a second panel reinforcement section that is arranged under the first panel reinforcement section and extends from the front end of the outer panel toward the rear end thereof. The first panel reinforcement section may be fixed to the outer panel only by the adhesion sections that are arranged in the first quadrant and the second quadrant, and the second panel reinforcement section may be fixed to the outer panel only by the adhesion sections that are arranged in the first quadrant and the fourth quadrant or only by the adhesion sections that are arranged in the first quadrant, the fourth quadrant and the third quadrant.

According to this configuration, the panel reinforcement has: the first panel reinforcement section that extends from the front end of the outer panel toward the rear end thereof; and the second panel reinforcement section that is arranged under the first panel reinforcement section and extends from the front end of the outer panel toward the rear end thereof. Therefore, even when the vehicle is subjected to the lateral collision, the rigidity of the outer panel is sufficiently maintained to prevent the outer panel from being easily deformed by the external force.

Therefore, the vehicle door according to the present disclosure is a vehicle door in which the outer panel is reinforced by the panel reinforcement, and is configured to generate the low-frequency sound dominantly at the time of closing the door.

DETAILED DESCRIPTION

A description will hereinafter be made of embodiments of the present disclosure with reference to the accompanying drawings.

First Embodiment

Figure 1:
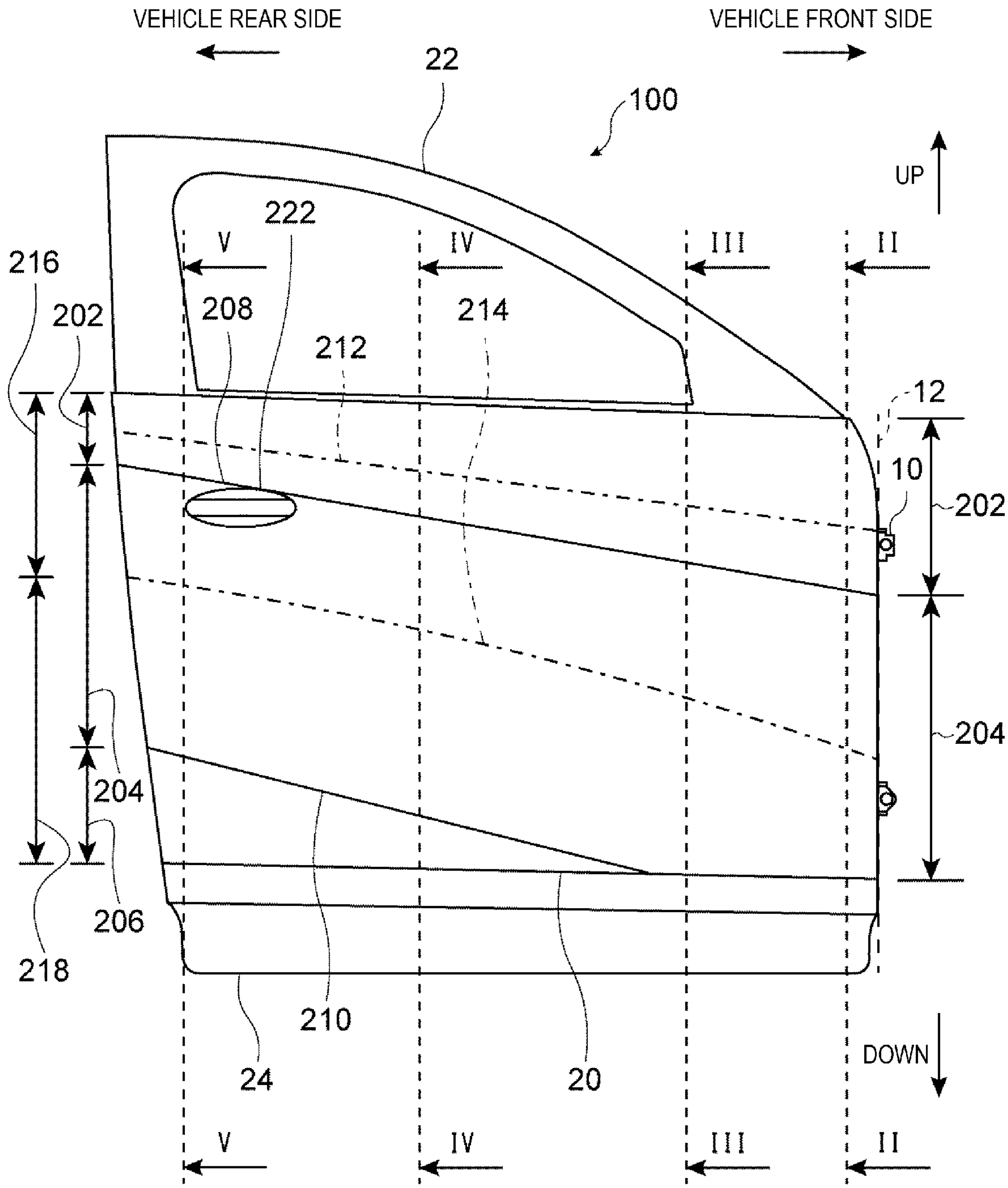
FIG. 1 is a front view in which a vehicle door according to a first embodiment of the present disclosure is seen from a vehicle outer side.
Figure 3:
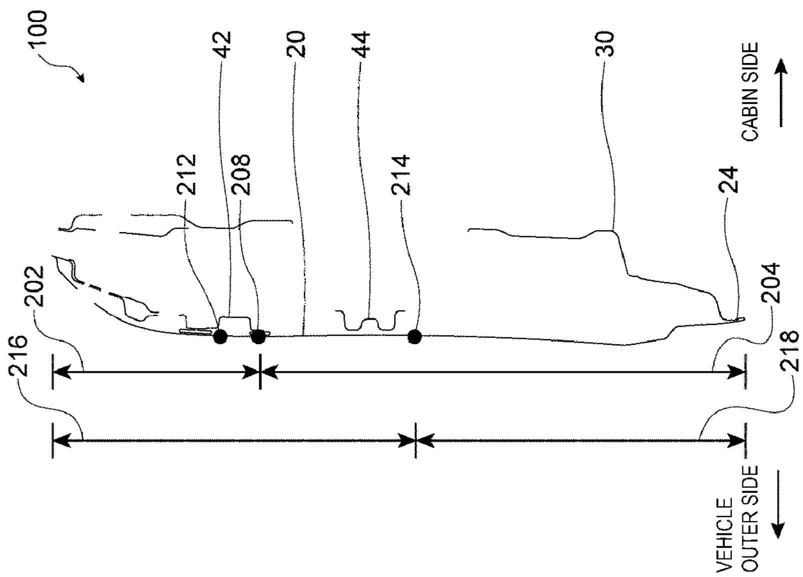
FIG. 3 is a cross-sectional view of the door that is taken along line III-III in FIG. 1.
Figure 2:
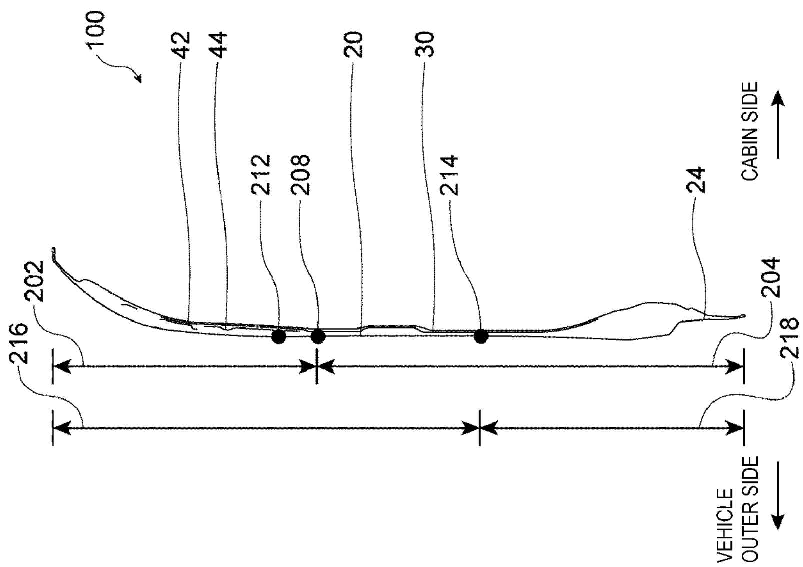
FIG. 2 is a cross-sectional view of the door that is taken along line II-II in FIG. 1.
Figure 5:
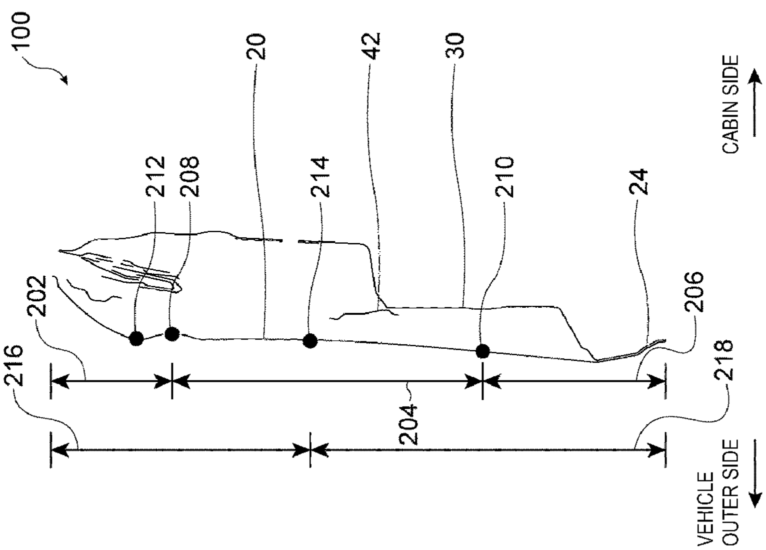
FIG. 5 is a cross-sectional view of the door that is taken along line V-V in FIG. 1.
Figure 4:
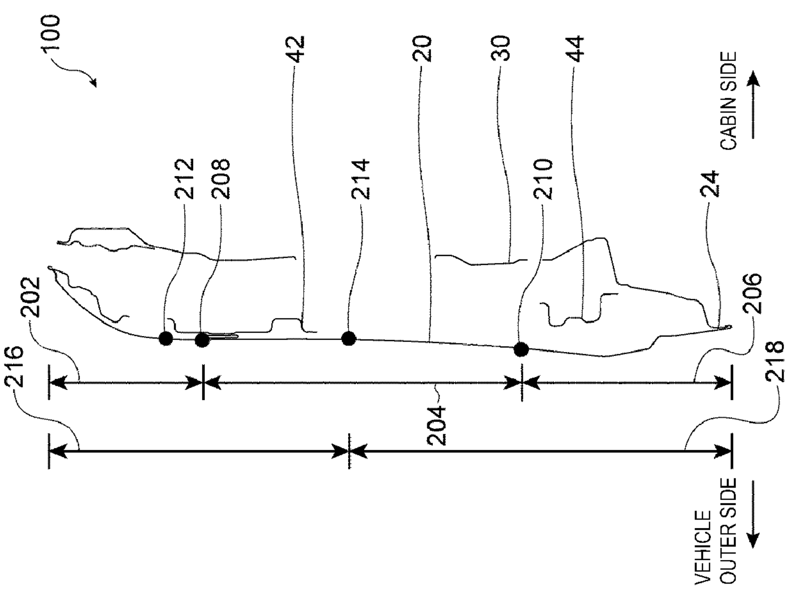
FIG. 4 is a cross-sectional view of the door that is taken along line IV-IV in FIG. 1.

FIG. 1 illustrates a vehicle door 100 according to a first embodiment, in particular, a front door that is seen on a right side when a vehicle is seen forward from the rear and that is located near a driver's seat or a front passenger seat on a vehicle front side.

The door 100 is coupled to a vehicle body, which is not illustrated, in a manner to be openable/closable about a vertical axis 12 and has: a substantially quadrilateral outer panel 20 that is attached in an openable and closable manner to the vehicle body by front hinges 10; a window frame 22 that is coupled on top of the outer panel 20; and a garnish attachment section 24 that is coupled to a bottom of the outer panel 20.

The outer panel 20 is formed by processing a steel plate having a thickness of 0.6 to 0.7 mm or an aluminum or plastic plate having substantially the same strength as the above steel plate, and has a streamlined shape that flows rearward from the front of the vehicle from a design perspective of giving a dynamic shape to the vehicle body and a technical perspective of reducing aerodynamic drag of the vehicle body. More specifically, the vehicle door 100 in the embodiment has three curved surfaces that are: a first belt-like convex section 202 on an upper side that is projected to a vehicle outer side and extends in a vehicle front-rear direction; a belt-like concave section 204 on an intermediate side that is provided adjacent to and under the first belt-like convex section 202, is projected to a cabin side, and extends in the vehicle front-rear direction; and a second belt-like convex section 206 on a lower side that is provided adjacent to and under the belt-like concave section 204, is projected to the vehicle outer side, and extends in the vehicle front-rear direction.

FIG. 2 to FIG. 5 are cross-sectional views of the outer panel that are respectively taken along lines II-II, III-III, IV-IV, and V-V in FIG. 1.

Returning to FIG. 1, a boundary between the first belt-like convex section 202 and the belt-like concave section 204 (that is, a line connecting inflection points that change from a convex curved surface to a concave curved surface) is indicated as a first inflection curve 208, and a boundary between the belt-like concave section 204 and the second belt-like convex section 206 (that is, a line connecting inflection points that change from the concave curved surface to a convex curved surface) is indicated as a second inflection curve 210.

As illustrated in FIG. 1, a line that indicates an upper edge of the first belt-like convex section 202 on the upper side extends almost horizontally while a line that indicates a lower edge of the first belt-like convex section 202 (which is also a line that indicates an upper edge of the belt-like concave section 204) extends to be gradually elevated from the front to the rear (from a right side to a left side of the drawing). A line that indicates a lower edge of the second belt-like convex section 206 on the lower side extends almost horizontally while a line that indicates an upper edge of the second belt-like convex section 206 (which is also a line that indicates a lower edge of the belt-like concave section 204) extends to be gradually elevated from the front to the rear. Both of the lines that respectively indicate the upper edge and the lower edge of the belt-like concave section 204 on the intermediate side extend to be gradually elevated from the front to the rear. Thus, a convex ridge line 212 connecting points, each of which is most projected to the vehicle outer side of a respective vertical cross section of the first belt-like convex section 202, and a concave bottom line 214 connecting points, each of which is recessed to the vehicle inner side in a respective vertical cross section of the belt-like concave section 204, also extend to be gradually elevated from the front to the rear.

Although not illustrated, outer surfaces of a vehicle body front portion and a rear door, each of which is adjacent to the door 100, are each formed with a concave-convex curved surface continuous with a concave-convex curved surface of the door 100. These concave-convex curved surfaces cooperatively create dynamic, streamlined external appearance of the vehicle.

In the illustrated embodiment, a front end of the second belt-like convex section 206 is located approximately in the middle between a front end and a rear end of the front door 100, and the second belt-like convex section 206 appears as a substantially triangular area (the second belt-like convex section 206) from the intermediate position thereof to the rear. However, similar to the first belt-like convex section 202 and the belt-like concave section 204, the front end of the second belt-like convex section 206 may be located at the front end of the front door 100.

Figure 6:
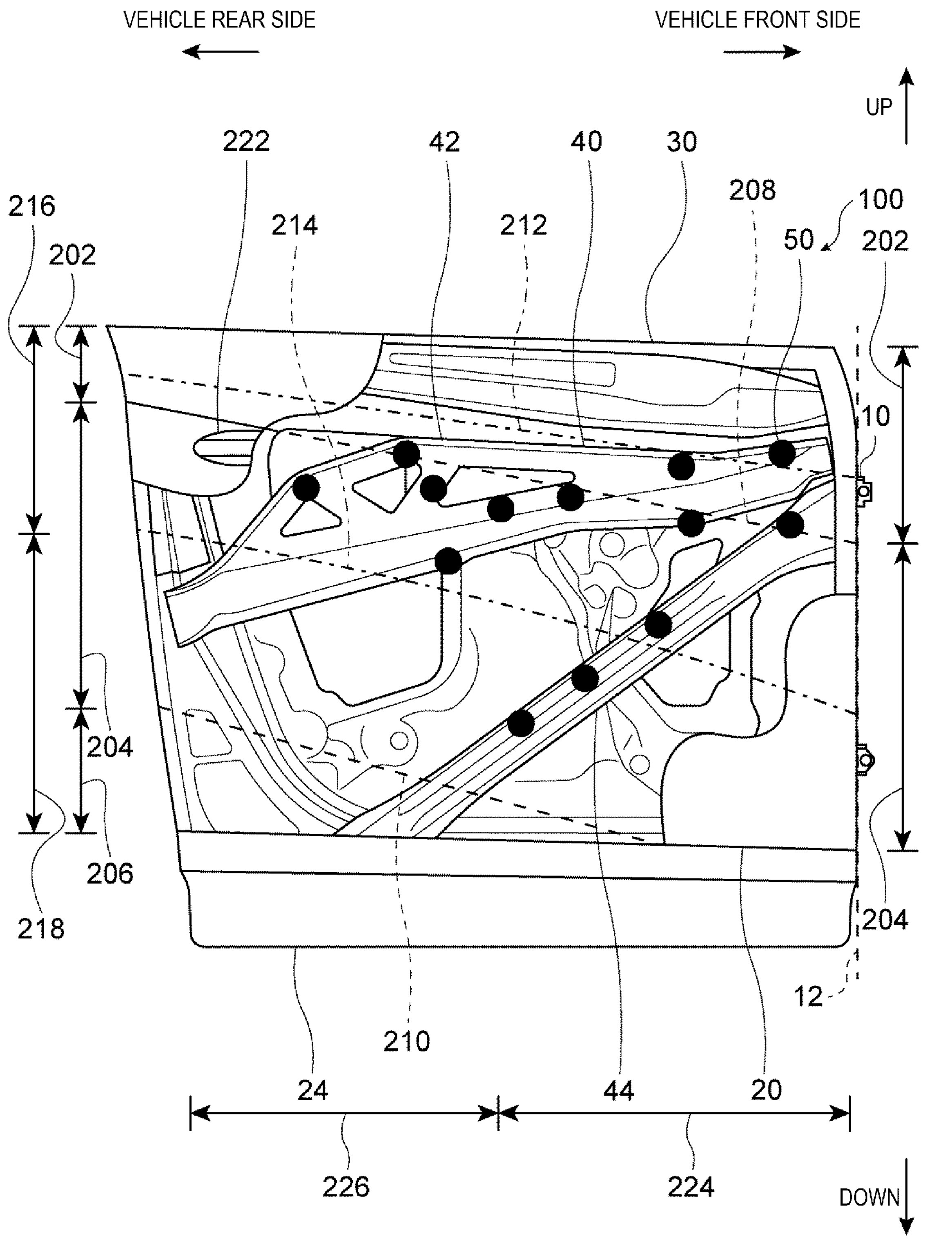
FIG. 6 is a front view of the door in FIG. 1, from which an outer panel is partially removed.

FIG. 6 is a view in which the door 100, from which the above-described outer panel 20 is partially removed, is seen from outside of the vehicle. As illustrated in FIG. 6, an inner panel 30 is disposed on the cabin side of the outer panel 20. Similar to the outer panel 20, the inner panel 30 is made of a metal plate, such as of iron or aluminum, or a plastic plate.

At a position between the outer panel 20 and the inner panel 30, a panel reinforcement 40 that reinforces the outer panel 20 is arranged along an inner surface of the outer panel 20 in a manner to expand (that is, in a manner that a vertical height is gradually increased) from a front end of the outer panel 20 toward a rear end thereof (from a right side to a left side of the drawing).

In the embodiment, the panel reinforcement 40 mainly includes a first panel reinforcement section 42 on an upper side and a second panel reinforcement section 44 on a lower side.

Similar to the outer panel 20, the first panel reinforcement section 42 and the second panel reinforcement section 44 are each made of the metal plate, such as of iron or aluminum, or the plastic plate.

In the first embodiment, the first panel reinforcement section 42 and the second panel reinforcement section 44 are each arranged to slope downward from the front end of the outer panel 20 toward the rear end thereof. The downward slope of the second panel reinforcement section 44 is set to be steeper than the downward slope of the first panel reinforcement section 42. Accordingly, an area surrounded by the first panel reinforcement section 42 and the second panel reinforcement section 44 expands toward a rear end.

Each of the first panel reinforcement section 42 and the second panel reinforcement section 44 fixedly adheres to the outer panel 20 by plural adhesion sections 50. For example, an epoxide-based adhesive or an adhesive using synthetic rubber as a material can be used as an adhesive for the adhesion sections 50. Each of the adhesion sections 50 has a substantially circular shape with a diameter of approximately 30 mm.

As illustrated, FIG. 6 illustrates areas of the first belt-like convex section 202, the belt-like concave section 204, the second belt-like convex section 206, the convex ridge line 212, and the concave bottom line 214, and the like so as to illustrates positional relationships among the areas and the like, each of which has been described with reference to FIG. 1, the panel reinforcement sections 42, 44, and the adhesion sections 50.

It is clear from this FIG. 6 that, at a position near an intermediate side of a front portion of the first belt-like convex section 202, a front end of the first panel reinforcement section 42 on the upper side is fixed to the outer panel 20 and, at a position near an intermediate side of a rear portion of the belt-like concave section 204, a rear end of the first panel reinforcement section 42 is fixed to the outer panel 20. In the embodiment, the first panel reinforcement section 42 is thick in an intermediate portion between the front end and the rear end (is vertically large) and is gradually thinned (becomes small vertically) from the intermediate portion toward each of the front end and the rear end. In addition, the first panel reinforcement section 42 is arranged to diagonally cross the first inflection curve 208, which is the boundary between the first belt-like convex section 202 and the belt-like concave section 204, from the front to the rear.

At a position near a lower side of the front portion of the first belt-like convex section 202, a front end of the second panel reinforcement section 44 is fixed to the outer panel 20 and, at a position near a lower side of an intermediate portion in the front-rear direction of the second belt-like convex section 206, a rear end of the second panel reinforcement section 44 is fixed to the outer panel 20.

Almost all of the adhesion sections 50 for the first panel reinforcement section 42 are located between near the convex ridge line 212 of the first belt-like convex section 202 and the concave bottom line 214 of the belt-like concave section 204, and are arranged along the first inflection curve 208, which is the boundary between the first belt-like convex section 202 and the belt-like concave section 204, or on an upper side and a lower side of the first inflection curve 208 with the first inflection curve 208 being a center. In particular, some of the adhesion sections 50 for the first panel reinforcement section 42 are arranged on or near the first inflection curve 208, and thus the outer panel 20 is strongly reinforced at such positions by the first panel reinforcement section 42.

A door handle 222 for opening/closing the door 100 is provided at a position near the rear end of the door 100 and near the first inflection curve 208. Thus, an area near the first inflection curve 208 is an area where an occupant may frequently touch at the time of opening/closing the door, and the like. In addition, the area near the first inflection curve 208 is an area that is likely to receive a shock and the like from the outside, and is also a vulnerable area to deformation due to zero curvature thereof. Thus, as described above, a large number of the adhesion sections 50 is arranged near the first inflection curve 208, and the outer panel 20 at such positions is integrated with and reinforced by the first panel reinforcement section 42.

Meanwhile, almost all of the adhesion sections 50 for the second panel reinforcement section 44 are arranged in an area of the belt-like concave section 204, and thus do not exist in the second belt-like convex section 206.

In the embodiment, in regard to the number of the adhesion sections 50, the number of the adhesion sections 50 for the first panel reinforcement section 42 is larger than the number of the adhesion sections 50 for the second panel reinforcement section 44. For example, in the embodiment, the nine adhesion sections 50 are provided for the first panel reinforcement section 42 while the four adhesion sections 50 are provided for the second panel reinforcement section 44.

Just as described, in the door 100 of the embodiment, a portion of the outer panel 20 near the first inflection curve 208, which is most likely to be applied with an external force, is integrated with and reinforced by the first panel reinforcement section 42 via the adhesion sections 50. Therefore, deformation of such a portion of the outer panel 20 is reliably prevented.

In addition, in the door 100 of the embodiment, the larger number of the adhesion sections 50 is provided in an upper area 216, which is located above the concave bottom line 214 of the belt-like concave section 204 of the outer panel 20, than the number of the adhesion sections 50 provided in a lower area 218, which is located under the concave bottom line 214. For example, the 11 adhesion sections 50 are arranged in the upper area 216 while the 2 adhesion sections 50 are arranged in the lower area 218. Therefore, compared to the lower area 218, in the upper area 216, a portion of the outer panel 20 and the panel reinforcement 40 supporting such a portion of the outer panel 20 are further integrated.

Furthermore, the large number of the adhesion sections 50 are provided in a front lower area 224 (see FIG. 6), which is located in the lower area 218 and near the front hinge 10, than in a rear lower area 226 (see FIG. 6) that is away from the front hinge 10. For example, the two adhesion sections 50 are arranged in the front lower area 224 while the adhesion section 50 is not arranged in the rear lower area 226. Therefore, compared to the rear lower area 226, in the front lower area 224, the portion of the outer panel 20 and the panel reinforcement 40 supporting such a portion of the outer panel 20 are further integrated.

For this reason, in the outer panel 20, rigidity of the upper area 216 is higher than rigidity of the lower area 218. Therefore, even when the occupant strongly touches the upper area 216 of the outer panel 20, or even when the shock is applied thereto from the outside, the outer panel 20 is not easily deformed.

Moreover, since the rigidity of the lower area 218 is lower than that of the upper area 216, the lower area 218 generates sound at a low frequency to give a sense of luxury at the time of closing the door 100.

In particular, the number of the adhesion sections 50 in the rear lower area 226 is smaller than the number of the adhesion sections 50 in the front lower area 224. For this reason, the sound generated from the rear lower area 226 has the lowest frequency and is the heaviest.

Figure 7:
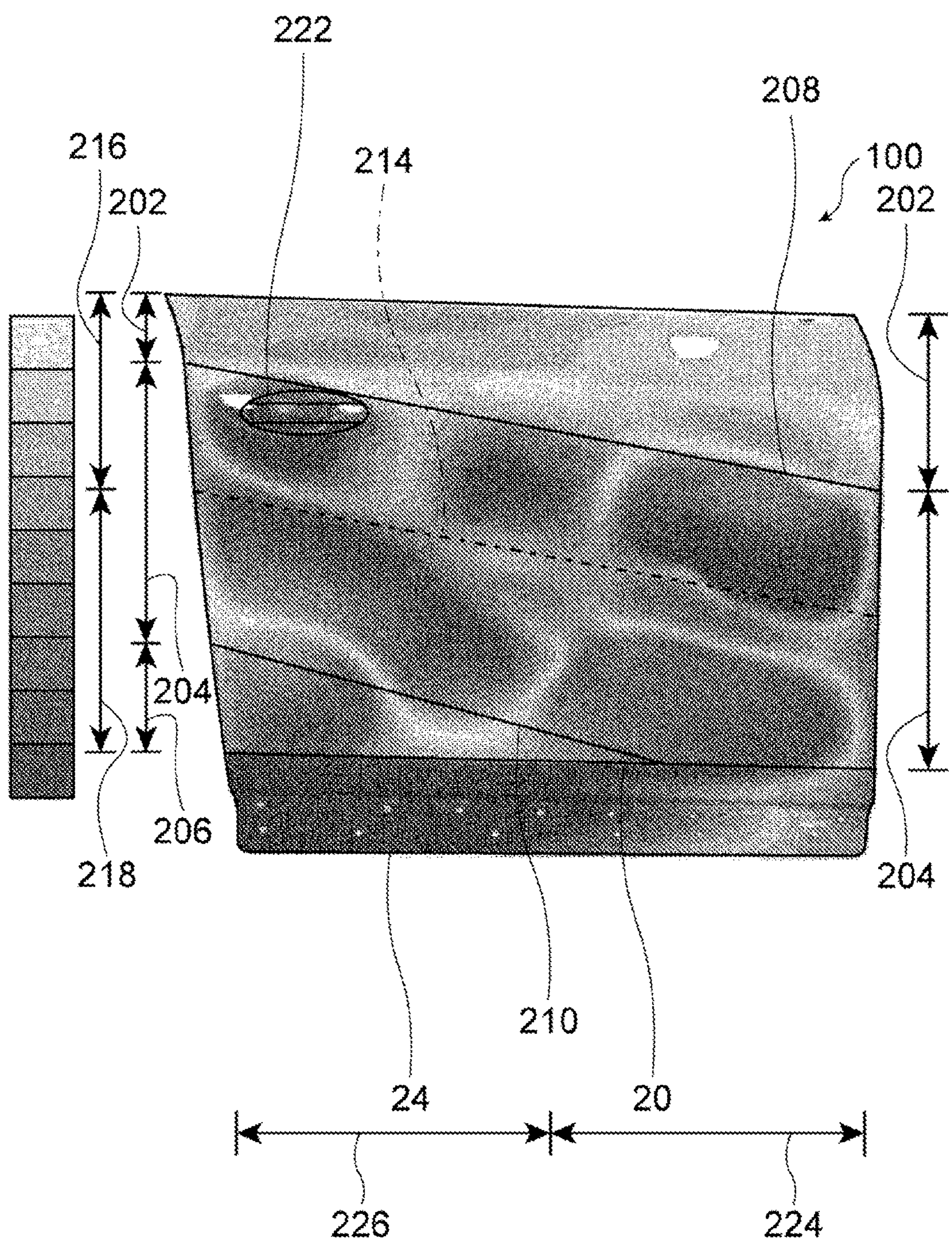
FIG. 7 is a distribution chart of vibration power that is generated at the time of closing the door in FIG. 1.

FIG. 7 illustrates distribution of vibration power that is generated on the outer panel 20 at the time of closing the door 100 in the above-described embodiment. In FIG. 7, a darker colored portion represents the higher power.

As illustrated in FIG. 7, the vibration power in the area above the first inflection curve 208 is much lower than that in the area under the first inflection curve 208. This indicates that the rigidity of the portion of the outer panel 20 near the first inflection curve 208 is high. Accordingly, even when the large force acts on the area near the first inflection curve 208 at the time of opening/closing the door 100, or the like, or even when the shock from the outside acts thereon, the portion of the outer panel 20 near the first inflection curve 208 is not easily deformed.

The vibration power in the lower area 218 under the first inflection curve 208 is much higher than that in the upper area 216 above the first inflection curve 208. In addition, when the lower area 218 is observed, the vibration power in the rear lower area 226 is higher than that in the front lower area 224. As a result, the lower area 218, particularly, the rear lower area 226 generates the bass sound at the time of closing the door.

In the above-described embodiment, most of the adhesion sections 50 are provided between the convex ridge line 212 and the concave bottom line 214. However, the number of the adhesion sections 50 to be arranged in this area is preferably within a range of 70% to 90% of the total number of the adhesion sections 50.

Second Embodiment

A description will be made of a vehicle door 100 according to a second embodiment of the present disclosure with reference to FIG. 8.

Figure 8:
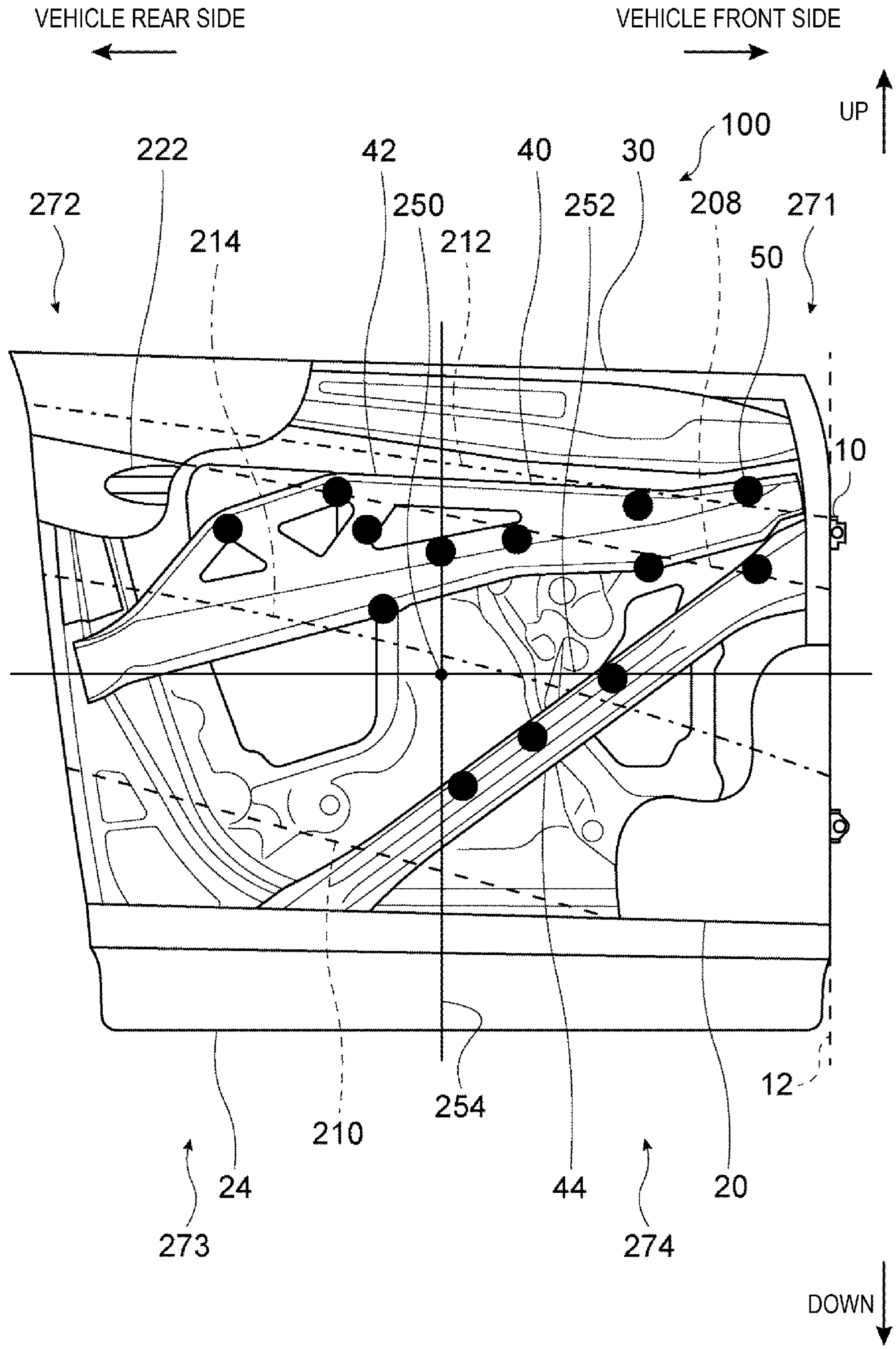
FIG. 8 is a front view of a door according to a second embodiment of the present disclosure, from which an outer panel is partially removed.

Similar to FIG. 6, FIG. 8 is a front view of a door that is seen on the right side of the vehicle, that is, on a side appearing as the right side when the vehicle is seen forward from the rear and that is located near the driver's seat or the front passenger seat on the vehicle front side. In FIG. 8, center of gravity 250 of the outer panel 20, a horizontal line 252 passing through the center of gravity 250, and a vertical line 254 passing through the center of gravity 250 are added to the configuration illustrated in FIG. 6. Accordingly, a configuration of the outer panel 20 illustrated in FIG. 8 is the same as the configuration of the outer panel 20 illustrated in FIG. 6. Thus, the same portions or corresponding portions will be denoted by the same reference signs and numerals, and a description thereon will not be made.

In the following description, four areas that are divided by the horizontal line 252 and the vertical line 254, that is, a front upper area, a rear upper area, a rear lower area, and a front lower area, which sequentially appear in a counter-clockwise direction in FIG. 8, will respectively be referred to as a first quadrant 271, a second quadrant 272, a third quadrant 273, and a fourth quadrant 274.

Here, this terminology is used to identify four areas of the door on the vehicle right side. Thus, in the case of an opposite front door on a vehicle left side, a front upper area, a rear upper area, a rear lower area, and a front lower area, which sequentially appear in a clockwise direction when this door is seen from the outside, respectively correspond to the first quadrant, the second quadrant, the third quadrant, and the fourth quadrant.

As illustrated in FIG. 8, the center of gravity 250 of the outer panel 20 is substantially located at a center of the belt-like concave section 204. In addition, most of the first panel reinforcement section 42 on the upper side extends obliquely downward from the front end of the door 100 toward the rear end thereof in the first quadrant 271 and the second quadrant 272, and the second panel reinforcement section 44 on the lower side extends obliquely downward from the front end of the door 100 toward the rear end thereof in the first quadrant 271, the fourth quadrant 274, and the third quadrant 273.

When FIG. 6 is seen in regard to the number of the adhesion sections 50, all of the adhesion sections 50 for the first panel reinforcement section 42 are distributed in the first quadrant 271 and the second quadrant 272, and the number of the adhesion sections 50 in each of the first quadrant 271 and the second quadrant 272 is almost the same. However, the number of the adhesion sections 50 provided in one of the first quadrant 271 and the second quadrant 272 may be larger than the number of the adhesion sections 50 provided in the other thereof.

The adhesion sections 50 for the second panel reinforcement section 44 are distributed in the first quadrant 271 and the fourth quadrant 274, and the number of the adhesion sections 50 provided in the third quadrant 273 is zero. Here, the number of the adhesion sections 50 provided in the fourth quadrant 274 is smaller than the number of the adhesion sections 50 provided in each of the first quadrant 271 and the second quadrant 272. In addition, the smaller number of the adhesion sections 50 than that in the fourth quadrant 274 may be provided in the third quadrant 273.

Just as described, in this embodiment, the number of the adhesion sections 50 provided in each of the first quadrant 271 and the second quadrant 272 is larger than the number of the adhesion sections 50 provided in each of the third quadrant 273 and the fourth quadrant 274, and the number of the adhesion sections 50 provided in the fourth quadrant 274 is larger than the number of the adhesion sections 50 provided in the third quadrant 273.

Since the adhesion sections 50 are arranged just as described, compared to the third quadrant 273 and the fourth quadrant 274, in the first quadrant 271 and the second quadrant 272, the outer panel 20 and the panel reinforcement 40 supporting the outer panel 20 are further integrated. In addition, compared to the third quadrant 273, in the fourth quadrant 274, the outer panel 20 and the panel reinforcement 40 supporting the outer panel 20 are further integrated.

For this reason, in the outer panel 20, the rigidity of each of the first quadrant 271 and the second quadrant 272 is higher than the rigidity of each of the third quadrant 273 and the fourth quadrant 274. Therefore, even when the occupant strongly touches the first quadrant 271 or the second quadrant 272 of the outer panel 20, or even when the shock is applied thereto from the outside, the outer panel 20 is not easily deformed.

The number of the adhesion sections 50 in the third quadrant 273 is smaller than the number of the adhesion sections 50 in each of the other first quadrant 271, second quadrant 272, and fourth quadrant 274. For this reason, the sound generated from the third quadrant 273 has the lowest frequency and is the heaviest.

OTHER EMBODIMENTS

A description has been made so far of the embodiments, in each of which the present disclosure is applied to the door located near the driver's seat or the front passenger seat. However, the present disclosure can also be applied to a door located near a rear seat in a similar manner. In addition, the present disclosure is not limited to the doors that are mounted on an automobile, but is also widely applicable to doors of other vehicles.

In the embodiments that have been described so far, the panel reinforcement 40 includes the two panel reinforcement sections 42, 44. However, the panel reinforcement may be formed by using a single plate material or may be formed by using three or more panel reinforcements.

What is claimed is:

1. A vehicle door having an outer panel that is attached in an openable and closable manner to a vehicle body by a front hinge; and a panel reinforcement that extends in a vehicle front-rear direction on an inner side of the outer panel, and in which the outer panel and the panel reinforcement are fixed by plural adhesion sections, wherein the outer panel includes:

a first belt-like convex section that is projected to a vehicle outer side and extends in the vehicle front-rear direction;

a belt-like concave section that is provided under the first belt-like convex section, is projected to a cabin side, and extends in the vehicle front-rear direction; and a second belt-like convex section that is provided under the belt-like concave section, is projected to the vehicle outer side, and extends in the vehicle front-rear direction, the belt-like concave section includes:

a concave bottom line that is located between an upper end and a lower end of the belt-like concave section, is most projected to the cabin side, and extends in a front-rear direction, the outer panel includes:

an upper area that is located above the concave bottom line; and a lower area that is located under the concave bottom line, the adhesion sections are disposed in both the upper area and the lower area, the number of the adhesion sections in the upper area is larger than the number of the adhesion sections in the lower area, and the number of the adhesion sections in a front lower area near the front hinge in the lower area is larger than the number of the adhesion sections in a rear lower area away from the front hinge in the lower area.

2. The vehicle door according to claim 1, wherein the plural adhesion sections exist on the concave bottom line.

3. The vehicle door according to claim 2, wherein the first belt-like convex section has:

a convex ridge line that is located between an upper end and a lower end of the first belt-like convex section, is most projected to the vehicle outer side, and extends in the front-rear direction, and the number of the adhesion sections provided between the concave bottom line and the convex ridge line falls within a range of 70% to 90% of the number of the adhesion sections, at each of which the outer panel and the panel reinforcement adhere to each other.

4. The vehicle door according to claim 3, wherein the panel reinforcement exists in a manner to expand from a front end of the outer panel toward a rear end thereof.

5. The vehicle door according to claim 4, wherein the panel reinforcement has:

a first panel reinforcement section that extends from the front end of the outer panel toward the rear end thereof; and a second panel reinforcement section that is arranged under the first panel reinforcement section and extends from the front end of the outer panel toward the rear end thereof, the first panel reinforcement section is fixed to the outer panel only by the adhesion section that is arranged in the upper area, and the second panel reinforcement section is fixed to the outer panel by the adhesion sections that are arranged in the upper area and the lower area.

6. The vehicle door according to claim 5, wherein the first panel reinforcement section is arranged to slope downward from the front end of the outer panel toward the rear end thereof, the second panel reinforcement section is arranged to slope downward from the front end of the outer panel toward the rear end thereof, and the downward slope of the second panel reinforcement section is steeper than the downward slope of the first panel reinforcement section.

7. The vehicle door according to claim 6, wherein a vertical length of the second belt-like convex section is increased toward a vehicle rear side.

8. The vehicle door according to claim 7, wherein the adhesion sections are only disposed in the first belt-like convex section and the belt-like concave section.

9. The vehicle door according to claim 1, wherein the first belt-like convex section has:

a convex ridge line that is located between an upper end and a lower end of the first belt-like convex section, is most projected to the vehicle outer side, and extends in the front-rear direction, and the number of the adhesion sections provided between the concave bottom line and the convex ridge line falls within a range of 70% to 90% of the number of the adhesion sections, at each of which the outer panel and the panel reinforcement adhere to each other.

10. The vehicle door according to claim 1, wherein the panel reinforcement exists in a manner to expand from a front end of the outer panel toward a rear end thereof.

11. The vehicle door according to claim 1, wherein the panel reinforcement has:

a first panel reinforcement section that extends from the front end of the outer panel toward the rear end thereof; and a second panel reinforcement section that is arranged under the first panel reinforcement section and extends from the front end of the outer panel toward the rear end thereof, the first panel reinforcement section is fixed to the outer panel only by the adhesion section that is arranged in the upper area, and the second panel reinforcement section is fixed to the outer panel by the adhesion sections that are arranged in the upper area and the lower area.

12. The vehicle door according to claim 11, wherein
the first panel reinforcement section is arranged to slope downward from the front end of the outer panel toward the rear end thereof,
the second panel reinforcement section is arranged to slope downward from the front end of the outer panel toward the rear end thereof, and
the downward slope of the second panel reinforcement section is steeper than the downward slope of the first panel reinforcement section.

13. The vehicle door according to claim 1, wherein
a vertical length of the second belt-like convex section is increased toward a vehicle rear side.

14. The vehicle door according to claim 1, wherein
the adhesion sections are only disposed in the first belt-like convex section and the belt-like concave section.

* * * * *